United States Patent
Huang et al.

(10) Patent No.: US 12,208,744 B2
(45) Date of Patent: Jan. 28, 2025

(54) DATA PROCESSING METHODS, DEVICES, AND APPARATUSES, AND MOVABLE PLATFORMS

(71) Applicant: SHENZHEN ZHUOYU TECHNOLOGY CO., LTD., Shenzhen (CN)

(72) Inventors: Yongjie Huang, Shenzhen (CN); Hongshan Li, Shenzhen (CN); Zhongqin Zhou, Shenzhen (CN); Zheyang Li, Shenzhen (CN)

(73) Assignee: SHENZHEN ZHUOYU TECHNOLOGY CO., LTD., Shenzhen (CN)

( * ) Notice: Subject to any disclaimer, the term of this patent is extended or adjusted under 35 U.S.C. 154(b) by 486 days.

(21) Appl. No.: 17/396,621

(22) Filed: Aug. 6, 2021

(65) Prior Publication Data
US 2021/0370832 A1 Dec. 2, 2021

Related U.S. Application Data (63) Continuation of application No. PCT/CN2019/083803, filed on Apr. 23, 2019.

(51) Int. Cl.
*B60R 1/31* (2022.01)
*B60R 1/24* (2022.01)
(Continued)

(52) U.S. Cl.
CPC ............... *B60R 1/31* (2022.01); *B60R 1/24* (2022.01); *G01S 7/20* (2013.01); *G01S 13/89* (2013.01);
(Continued)

(58) Field of Classification Search
CPC ....... B60R 1/31; B60R 1/24; B60R 2300/105; B60R 2300/301; B60R 2300/303;
(Continued)

(56) References Cited

U.S. PATENT DOCUMENTS 6,396,397 B1 * 5/2002 Bos .......................... B60R 1/12
348/E7.086
7,319,805 B2 * 1/2008 Remillard ................ H04N 5/33
382/104
(Continued)

FOREIGN PATENT DOCUMENTS

CN 103617647 A * 3/2014 ............. G06T 17/00
CN 104385987 A 3/2015
(Continued)

OTHER PUBLICATIONS

Anonymous: "Autonomous Shuttles Turn to 2D Flash Lidar Technologyto Eliminate Blind Spots and Ensure Ultimate Security",, Dec. 21, 2018 (Dec. 21, 2018), XP055902166, Retrieved from the Internet: URL:https://leddartech.com/app/uploads/dim_uploads/2018/12/20181221AppNoteShuttleLiDARforBlindSpotsENLeddarTech-1.pdf [retrieved on Mar. 16, 2022].
(Continued)

*Primary Examiner* — Nuzhat Pervin (57) ABSTRACT

The present disclosure provides a method, a device, and an apparatus for processing data, and a movable platform; the method is applied to the movable platform that includes a sensor, and includes: collecting at least two directions of an environment surrounding the movable platform through a sensor, performing three-dimensional reconstruction of the environmental data in the at least two directions to obtain three-dimensional environmental information of the environment surrounding the movable platform, and further displaying the three-dimensional environmental information
(Continued)

on a display apparatus. The present disclosure may assist a driver in driving and improve the driving safety of the movable platform.

17 Claims, 8 Drawing Sheets

(51) Int. Cl.
   *G01S 7/20*    (2006.01)
   *G01S 13/89*   (2006.01)
   *G01S 13/931*  (2020.01)

(52) U.S. Cl.
   CPC ....... *G01S 13/931* (2013.01); *B60R 2300/105* (2013.01); *B60R 2300/301* (2013.01); *B60R 2300/303* (2013.01); *B60R 2300/804* (2013.01); *G01S 2013/9323* (2020.01); *G01S 2013/9324* (2020.01)

(58) Field of Classification Search
   CPC ..... B60R 2300/804; G01S 7/20; G01S 13/89; G01S 13/931; G01S 2013/9323; G01S 2013/9324
   USPC .......................................................... 342/179
   See application file for complete search history.

(56) References Cited

U.S. PATENT DOCUMENTS

| | | | | |
|---|---|---|---|---|
| 8,825,391 | B1* | 9/2014 | Urmson | G09B 29/12 |
| | | | | 701/448 |
| 9,201,424 | B1* | 12/2015 | Ogale | G05D 1/0253 |
| 9,796,416 | B2* | 10/2017 | Fujii | B62D 6/002 |
| 9,931,983 | B2* | 4/2018 | Yun | B60W 30/02 |
| 9,956,963 | B2* | 5/2018 | Vijaya Kumar | B60W 40/08 |
| 10,019,017 | B2* | 7/2018 | Taguchi | B60W 60/005 |
| 10,031,227 | B2* | 7/2018 | Kiyokawa | B62D 15/0285 |
| 10,271,766 | B1* | 4/2019 | Parker, Jr. | A61B 5/0833 |
| 10,445,600 | B2* | 10/2019 | Divekar | B60T 7/22 |
| 10,872,228 | B1* | 12/2020 | Zhou | G06V 20/64 |
| 10,942,272 | B2* | 3/2021 | Droz | G01S 17/89 |
| 10,982,968 | B2* | 4/2021 | Elangovan | G01C 21/3647 |
| 11,393,340 | B2* | 7/2022 | Kim | G08G 1/143 |
| 11,519,737 | B2* | 12/2022 | Appelman | G01C 21/20 |
| 11,536,572 | B2* | 12/2022 | Agarwal | G01C 21/1656 |
| 11,536,833 | B2* | 12/2022 | Tasaki | G06V 20/653 |
| 11,550,315 | B2* | 1/2023 | Bethke | G01M 5/0075 |
| 11,567,201 | B2* | 1/2023 | Zhang | G01S 7/51 |
| 11,573,325 | B2* | 2/2023 | Huber | G01S 17/89 |
| 11,573,562 | B2* | 2/2023 | Bachrach | G05D 1/0027 |
| 11,573,575 | B2* | 2/2023 | Paglieroni | G05D 1/0238 |
| 11,585,662 | B2* | 2/2023 | Zhang | G01C 21/1652 |
| 11,590,655 | B2* | 2/2023 | Xiong | B25J 9/1697 |
| 11,614,734 | B2* | 3/2023 | Bergan | G05D 1/104 |
| | | | | 701/2 |
| 11,635,776 | B2* | 4/2023 | Takizawa | B64C 13/20 |
| | | | | 701/3 |
| 11,659,322 | B1* | 5/2023 | Woodworth | G05D 1/0022 |
| | | | | 701/2 |
| 11,694,430 | B2* | 7/2023 | Moosaei | G06V 20/584 |
| | | | | 382/156 |
| 11,796,673 | B2* | 10/2023 | Beer | G08G 5/045 |
| 11,797,028 | B2* | 10/2023 | Zhang | G05D 1/0094 |
| 2002/0135468 | A1* | 9/2002 | Bos | G06T 7/97 |
| | | | | 340/436 |
| 2006/0125919 | A1* | 6/2006 | Camilleri | H04N 7/188 |
| | | | | 348/148 |
| 2010/0117812 | A1 | 5/2010 | Laubinger et al. | |
| 2015/0051797 | A1* | 2/2015 | Ehlgen | B60Q 1/085 |
| | | | | 701/49 |
| 2016/0070265 | A1* | 3/2016 | Liu | G05D 1/652 |
| | | | | 701/25 |
| 2017/0225639 | A1* | 8/2017 | Chacon | G07C 5/008 |
| 2017/0248694 | A1* | 8/2017 | Rosenblum | G01S 13/867 |
| 2019/0026947 | A1 | 1/2019 | Herman et al. | |
| 2019/0052844 | A1 | 2/2019 | Droz et al. | |
| 2019/0080313 | A1* | 3/2019 | Van Wiemeersch | |
| | | | | B60R 25/305 |
| 2020/0096641 | A1* | 3/2020 | Sasaki | G06T 17/00 |
| 2020/0215972 | A1* | 7/2020 | Herman | B60R 11/04 |
| 2020/0225044 | A1* | 7/2020 | Tohriyama | G01C 21/3848 |
| 2020/0331465 | A1* | 10/2020 | Herman | G08G 1/161 |
| 2020/0362807 | A1* | 11/2020 | Tedesco | F02N 11/0822 |
| 2020/0372664 | A1* | 11/2020 | He | G01S 17/931 |
| 2022/0066456 | A1* | 3/2022 | Ebrahimi Afrouzi | |
| | | | | G06F 3/04883 |
| 2022/0180542 | A1* | 6/2022 | He | G06V 10/443 |

FOREIGN PATENT DOCUMENTS

| | | | | |
|---|---|---|---|---|
| CN | 204845715 | U | | 12/2015 |
| CN | 105892489 | A | | 8/2016 |
| CN | 107862733 | A | | 3/2018 |
| CN | 108369722 | A | * | 8/2018 ............ G01C 21/20 |
| CN | 108701373 | A | | 10/2018 |
| CN | 109214987 | A | | 1/2019 |
| DE | 102017217870 | A1 | | 4/2019 |
| WO | WO-2005013236 | A1 | * | 2/2005 ........... A61F 9/0017 |
| WO | 2014210158 | A2 | | 12/2014 |

OTHER PUBLICATIONS

Nikolic Zoran et al: "TI Gives Sight to Vision-Enabled Automotive Technologies", Texas Instruments White Paper, Oct. 31, 2013 (Oct. 31, 2013), XP55901706, Retrieved from the Internet:URL:http://www.ti.com/lit/wp/spry250/spry250.pdf [retrieved on Mar. 15, 2022].
Anonymous: "The Evolution of Deep Learning for ADAS Applications—Groupement ADAS: AdvancedDriver Assistance Systems", Jan. 8, 2019 (Jan. 8, 2019), XP055901703, Retrieved from the Internet: URL:http://groupementadas.canalblog.com/archives/2019/01/08/36981574.html[retrieved on Mar. 15, 2022].
International Search Report of PCT/CN2019/083803 (Jan. 23, 2020).
Rezaei Mahdi et al: "Multisensor Data Fusion Strategies for Advanced Driver Assistance Systems" In: "Sensor and Data Fusion", Feb. 1, 2009 (Feb. 1, 2009), ITech Education and Publishing, XP055957268, ISBN: 978-3-902613-52-3 pp. 1-28, DOI: 10.5772/6575.
Ilic Velibor et al: "Development of Sensor Fusion Based ADASModulesin Virtual Environments", 2018 Zooming Innovation in Consumer Technologies Conference (ZINC), IEEE, May 30, 2018 (May 30, 2018), pp. 88-91, XP033395812, DOI: 10.1109/ZINC.2018.8448849 [retrieved on Aug. 27, 2018].

* cited by examiner

DATA PROCESSING METHODS, DEVICES, AND APPARATUSES, AND MOVABLE PLATFORMS

RELATED APPLICATIONS

This application is a continuation application of PCT application No. PCT/CN2019/083803, filed on Apr. 23, 2019, and the content of which is incorporated herein by reference in its entirety.

TECHNICAL FIELD

The present disclosure relates to the technical field of intelligent driving, and in particular, to a data processing method, device, and apparatus, and a movable platform.

BACKGROUND

As it moves, a movable platform of autonomous driving can sense the mobile environment through a sensing system, and control movement parameters of the movable platform based on environmental data (such as movement route and obstacle information) obtained by sensing, so that the movable platform may safely and reliably move along a movement route and reach a predetermined destination.

However, as the autonomous driving environment of a movable platform is complex and ever changeable, and the reliability requirements are extremely high as safety issues are involved, the realization of autonomous driving needs to overcome many technical difficulties. Therefore, there will be a longer transition period from the current assisted driving to the final stage of fully autonomous driving.

During the transitional stage far from fully autonomous driving or when a movable platform is not in automatic driving, how to provide a driver with environmental data in a more effective and accurate way to assist the driver to drive, thereby improving the safety of the movable platform, has become a hot issue of research.

SUMMARY

The present disclosure provides a data processing method, device, and apparatus, a movable platform, and a storage medium, which may display environmental information in a better way.

In an aspect, the present disclosure provides a data processing method for a movable platform, including collecting, through at least one sensor of a movable platform, environmental data in at least two directions of an environment surrounding the movable platform; performing three-dimensional reconstruction on the environmental data in the at least two directions to obtain three-dimensional environmental information of the environment surrounding the movable platform; sending the three-dimensional environmental information to a display apparatus; and displaying the three-dimensional environmental information on the display apparatus.

In another aspect, the present disclosure provides an apparatus, including: at least one sensor; at least one storage medium storing a set of instructions for processing data for a movable platform; and at least one processor in communication with the at least one storage medium, wherein during operation, the at least one processor executes the set of instructions to: collect environmental data in at least two directions of an environment surrounding the movable platform through the at least one sensor; perform three-dimen-sional reconstruction on the environmental data in the at least two directions to obtain three-dimensional environmental information of the environment surrounding the movable platform; send the three-dimensional environmental information to a display apparatus; and display the three-dimensional environmental information on the display apparatus.

In yet another aspect, the present disclosure provides a movable platform, including: at least one sensor; at least one storage medium storing a set of instructions for processing data for the movable platform; and at least one processor in communication with the at least one storage medium, wherein during operation, the at least one processor executes the set of instructions to: collect, through the at least one sensor, environmental data in at least two directions of an environment surrounding the movable platform; perform three-dimensional reconstruction on the environmental data in the at least two directions to obtain three-dimensional environmental information of the environment surrounding the movable platform; send the three-dimensional environmental information to a display apparatus; and display the three-dimensional environmental information on the display apparatus.

According to some exemplary embodiments of the present disclosure, the movable platform may collect environmental data in at least two directions of an environment surrounding the movable platform through a sensor, perform three-dimensional reconstruction of the environmental data in the at least two directions to obtain three-dimensional environmental information of the environment surrounding the movable platform, and further display the three-dimensional environmental information on a display apparatus. According to the present disclosure, on the one hand, the environmental data of the movable platform in a plurality of directions may be obtained, which is conducive to ensuring the integrity and accuracy of the obtained environmental data; on the other hand, the collected environmental data may be processed in real time, and the three-dimensional environmental information that is obtained by processing may be displayed on the display apparatus in real time, so that a driver can intuitively know the environmental information of the environment surrounding the movable platform, which may assist the driver more effectively in driving and improve the driving safety of the movable platform.

BRIEF DESCRIPTION OF THE DRAWINGS

To explain some exemplary embodiments of the present disclosure or the technical solutions in the existing technology more clearly, the drawings used in the illustrations of the embodiments or the existing technology will be introduced briefly below. Obviously, the drawings in the following illustrations only relate to some embodiments of the present disclosure. For those skilled in the art, other drawings may be further obtained on the basis of these drawings without inventive skills.

DETAILED DESCRIPTION

Some exemplary embodiments of the present disclosure provide a data processing method, which may be applied to a movable platform. The movable platform may be some types of mobile device that may run on public roads, such as an autonomous driving vehicle, a smart electric vehicle, a scooter, and a balance vehicle; it may also be a flying device that flies in the sky, such as a drone and an aerial photographing aircraft; it may also be an driving assistance device mounted on these mobile devices, such as a driving recorder mounted on a mobile device.

In some exemplary embodiments, the movable platform may include a sensor for collecting environmental data in at least two directions of an environment surrounding the movable platform; for example, the sensor may include at least one of a vision sensor, a lidar, a millimeter-wave radar, and an ultrasonic sensor; the environmental data may include point cloud data of obstacles in the surrounding environment or environmental images corresponding to the surrounding environment. In some exemplary embodiments, the movable platform may also include a display apparatus, which is used for displaying three-dimensional environmental information (such as an three-dimensional environmental image), so that the driver may view the environmental information of the surrounding environment more intuitively, thereby archiving the purpose of assisting the driver in driving, and improving the driving safety of the movable platform.

Figure 1A:
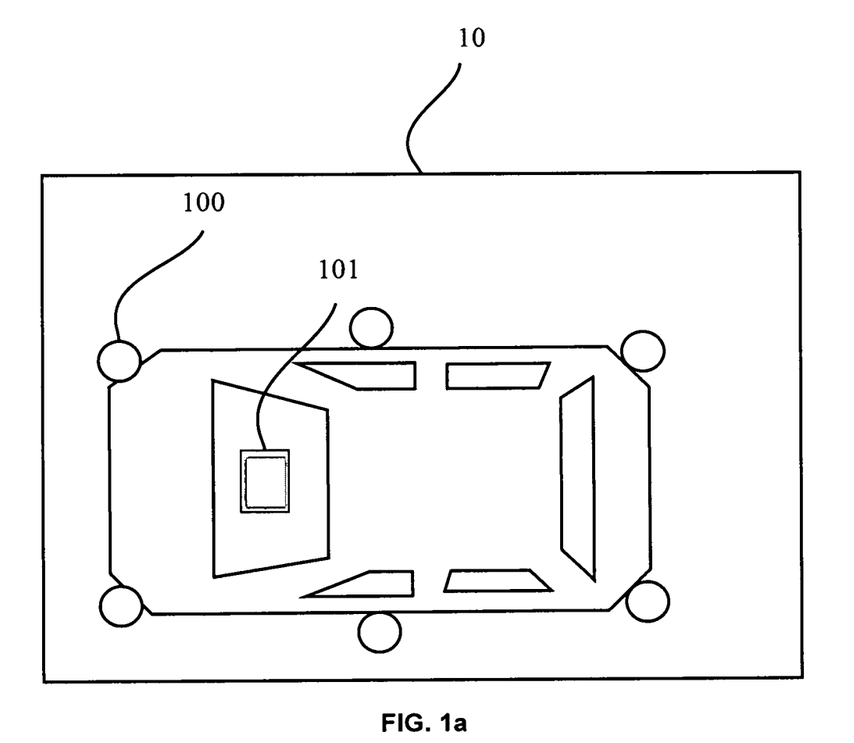
FIG. 1a is a structural diagram of a movable platform according to some exemplary embodiments of the present disclosure.

FIG. 1a shows a movable platform 10, which includes a plurality of sensors 100 and a display apparatus 101; FIG. 1a shows six sensors 100. As can be seen, both the sensors 100 and the display apparatus 101 may be fixed to a main structure of the movable platform; where the sensors 100 may be externally placed in at least two directions of the movable platform for collecting environmental data in the at least two directions of the environment surrounding the movable platform; the display apparatus 101 may be placed in the movable platform for displaying three-dimensional reconstruction of the environmental data to obtain three-dimensional environmental information of the surrounding environment (such as an environmental image and/or a point cloud image of the surrounding environment).

Figure 1B:
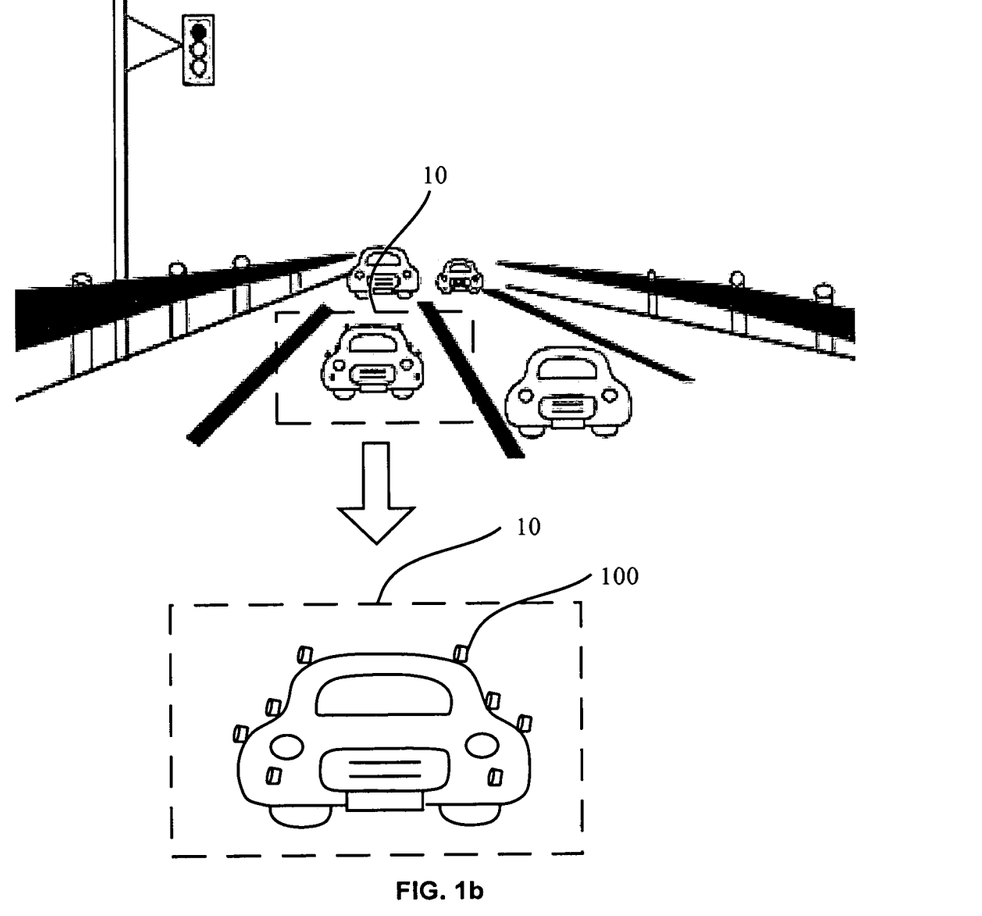
FIG. 1b is a diagram of a scenario according to some exemplary embodiments of the present disclosure.

In some exemplary embodiments, referring to FIG. 1b, the movable platform 10 may be a car running on a public road, and a plurality of sensors 100 are externally placed on the car (on the front, rear, left, and right sides of the car body). FIG. 1b shows eight sensors 100, wherein the sensors may include at least one of a vision sensor, a lidar, a millimeter-wave radar, and an ultrasonic sensor. In some exemplary embodiments, the movable platform 10 may collect surrounding environmental data through a plurality of sensors 100, and perform three-dimensional reconstruction on the surrounding environmental data to obtain three-dimensional environmental information of the surrounding environment. Further, the movable platform 100 may display the three-dimensional environmental information through a display apparatus provided thereon. According to the present disclosure, on the one hand, environmental data of the movable platform in a plurality of directions can be obtained, and the integrity of the environmental data can be ensured; on the other hand, the collected environmental data can be processed, and three-dimensional environmental information obtained by processing can be displayed on the display apparatus in real time, so that a driver can intuitively view the environmental information of the surrounding environment, which can assist the driver more effectively in driving and improve the driving safety of the movable platform.

The movable platform 10 in FIGS. 1a and 1b is for illustrative purpose only; in other examples, the movable platform shown in FIGS. 1a and 1b may also be an assistant driving device mounted on a mobile device, such as a driving recorder mounted on a mobile device. It may also be a flying device that flies in the sky, such as a drone and an aerial photographing aircraft. At the same time, FIG. 1b only gives an example of a scenario involved in an embodiment of the present disclosure, and mainly serves to illustrate the principle of assisting the driver to drive the movable platform based on the sensors and the display apparatus in the embodiment of the present disclosure.

Figure 2:
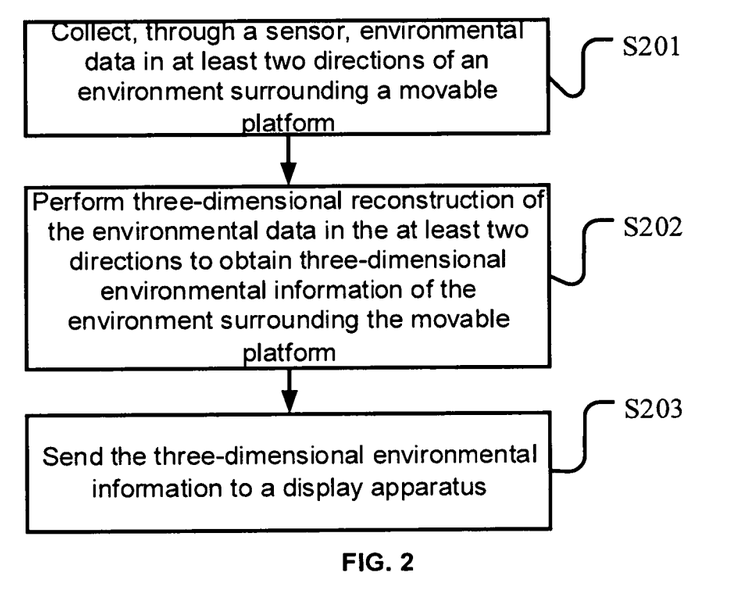
FIG. 2 is a flow diagram of a data processing method according to some exemplary embodiments of the present disclosure.

Referring to FIG. 2, FIG. 2 is a flow diagram of a data processing method provided in an embodiment of the present disclosure; the method in the embodiment of the present disclosure may be executed by a movable platform that includes a sensor.

In the data processing method shown in FIG. 2, in S201, the movable platform may collect environmental data in at least two directions of an environment surrounding the movable platform through the sensor. The sensor may include at least one of a vision sensor, a lidar, a millimeter-wave radar, and an ultrasonic sensor.

In S202, after the movable platform collects environmental data in the at least two directions of the environment surrounding the movable platform through the sensor, three-dimensional reconstruction of the environmental data in the at least two directions may be carried out to obtain three-dimensional environmental information of the environment surrounding the movable platform. In some exemplary embodiments, the movable platform may combine the environmental data in the at least two directions to realize the three-dimensional reconstruction, that is, reconstruct the environmental data in three-dimension.

In some exemplary embodiments, the sensors may include passive light source sensors such as a plurality of vision sensors (for example, camera devices), which may be arranged in a plurality of directions on the movable platform (including front, rear, left, right, etc.), and may scan the movable platform in a plurality of directions to realize multi-directional coverage of the movable platform. In this case, the vision sensors may combine environmental images (i.e., environmental data) that are collected in the plurality of directions to realize the three-dimensional reconstruction of the environmental images in various directions. For example, the vision sensors collect an environmental image 1 in the front of the movable platform, an environmental image 2 in the rear thereof, an environmental image 3 on the left thereof, and an environmental image 4 on the right thereof; further, the movable platform may combine the environmental image 1, the environmental image 2, the environmental image 3 and the environmental image 4 together to form a three-dimensional environmental image (i.e., three-dimensional environmental information) of the environment surrounding the movable platform, including four directions, i.e., front, rear, left, and right.

In some exemplary embodiments, the sensor may include active light source sensors, such as a plurality of lidars or millimeter-wave radars, which may be arranged in a plurality of directions (including front, rear, left, right, etc.) of the movable platform, and may scan the movable platform in the plurality of directions to realize multi-directional coverage of the movable platform. In this case, the movable platform may collect point cloud data (i.e., environmental data) of obstacles in a plurality of directions in the surrounding environment through the lidars or millimeter-wave radars, integrate the point cloud data of the obstacles in a plurality of directions, and perform reverse three-dimensional reconstruction of the integrated point cloud data to obtain a three-dimensional image (i.e., three-dimensional environmental information) of the obstacles in the environment surrounding the movable platform.

In some exemplary embodiments, the sensor may further include a rotating lidar, which can rotate 360° to scan the environment surrounding the movable platform in a plurality of directions, so as to realize multi-directional coverage of the movable platform.

Figure 3:
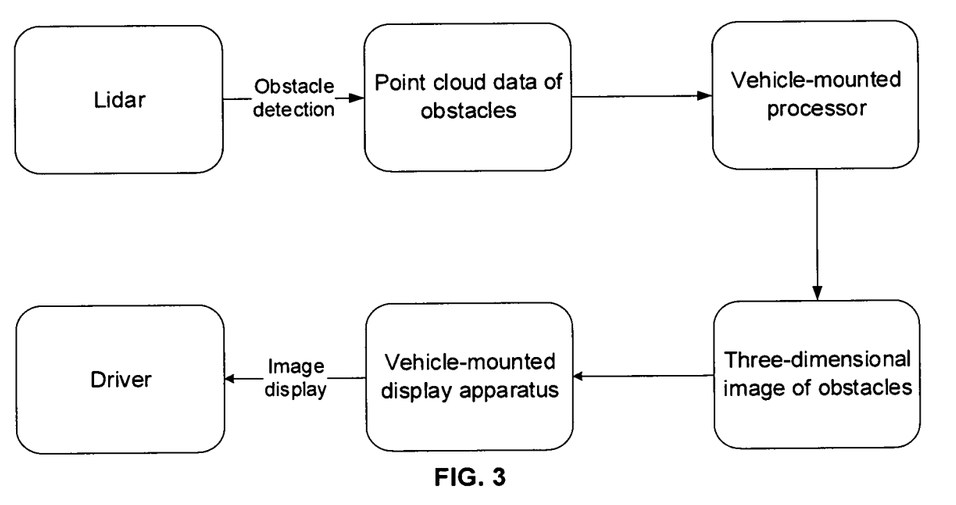
FIG. 3 is a flow diagram of a data processing method according to some exemplary embodiments of the present disclosure.

For example, referring to FIG. 3, it is assumed that the movable platform is a semi-autonomous driving car, which is provided with lidars around the car body to realize multi-directional coverage. In addition, the car is configured with a vehicle-mounted processor and a vehicle-mounted display apparatus. As it runs, the car may detect obstacles in the surrounding environment through the lidars to obtain point cloud data of the obstacles in the surrounding environment, and the vehicle-mounted processor performs reverse three-dimensional reconstruction of the point cloud data of the obstacles to obtain a three-dimensional image of obstacles in the surrounding environment. Further, the three-dimensional image of the obstacles may be displayed by the vehicle-mounted display apparatus. A driver may view the information (such as information of the distance between the obstacles and the movable platform, and the type(s) of the obstacles) of obstacles in various directions in the surrounding environment, to assist the driver in driving and reduce the difficulty of driving the car. Accordingly, the driving safety of the car can also be improved.

In some exemplary embodiments, at least one of the vision sensor, the lidar, and the millimeter-wave radar may be used as a main sensor, and the ultrasonic sensor may be used as an assistant sensor for collecting environmental data that correspond to a scanning blind area of the chain sensor. In this way, 360° multi-directional coverage of the environment surrounding the movable platform can be realized.

Figure 4:
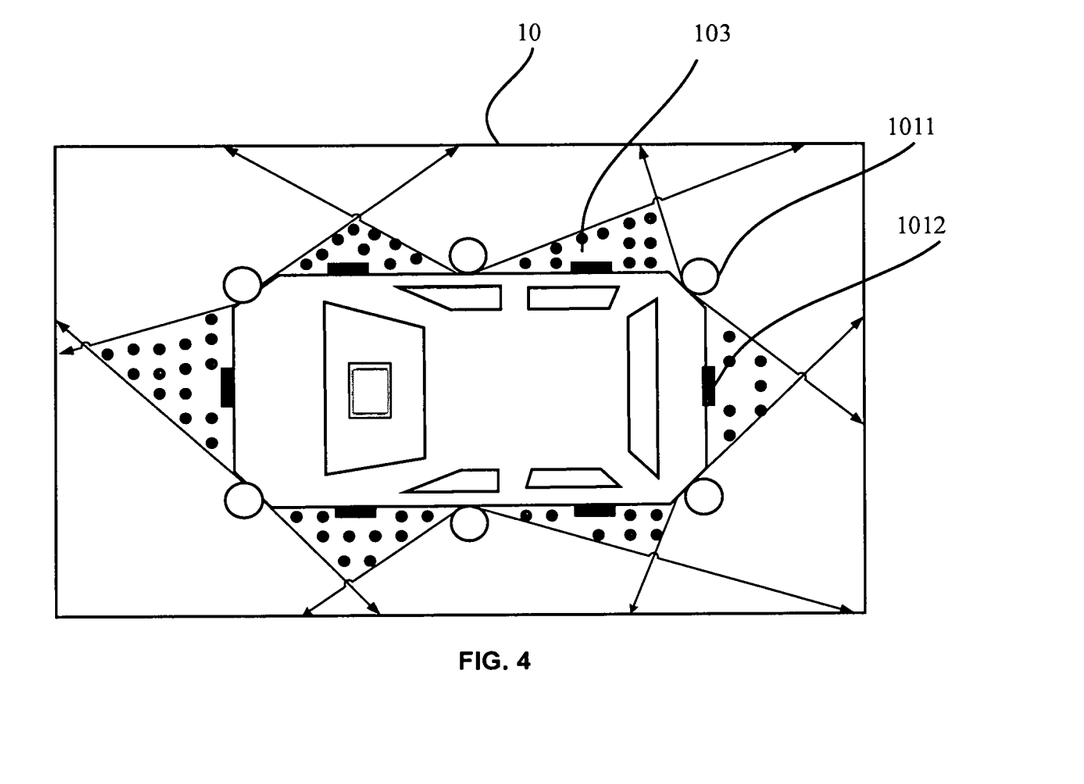
FIG. 4 is a diagram of a sensor collecting environmental data according to some exemplary embodiments of the present disclosure.

In some exemplary embodiments, it is assumed that the main sensor is a lidar and the assistant sensor is an ultrasonic sensor. For example, referring to FIG. 4, the movable platform 10 includes a main sensor, i.e., a lidar 1011; FIG. 4 shows six lidars, which can scan the movable platform in four directions, i.e., front, rear, left, and right; the movable platform 10 also includes an assistant sensor, i.e., an ultrasonic sensor 1012; FIG. 4 shows six ultrasonic sensors, which may collect environmental data that correspond to a scanning blind area 103 of the lidars. The shaded parts in FIG. 4 are scanning blind areas of the lidars; a total of six scanning blind areas are shown. The scanning areas of the six ultrasonic sensors 1012 arranged around the movable platform can cover the above six scanning blind areas.

The at least two directions in step S201 may include omni-directions or a plurality of directions as designated, which is not specifically limited in the present disclosure.

Further, in S203, after obtaining the three-dimensional environmental information of the environment surrounding the movable platform itself, the three-dimensional environmental information may be sent to a display apparatus, and then displayed by the display apparatus. The display apparatus may be pre-equipped with the movable platform before leaving the factory, or it may be additionally installed after leaving the factory as required.

In some exemplary embodiments, the movable platform may be a vehicle; in this case, the display apparatus may be located inside the vehicle, such as a vehicle-mounted display apparatus of the vehicle; the display apparatus may also be located outside the vehicle, and has established communication connection with the vehicle; after the vehicle obtains the three-dimensional environmental information of its surrounding environment, the three-dimensional environmental information may be displayed on the display apparatus that is located outside of the vehicle.

In some exemplary embodiments, the movable platform may include a drone, and the display apparatus may be located outside the drone. After the drone obtains three-dimensional environmental information of its surrounding environment, it may send the three-dimensional environmental information to the display apparatus, so that a user of the display apparatus may control the flight of the drone after viewing the three-dimensional environmental information.

In some exemplary embodiments, after the movable platform obtains the three-dimensional environmental information of the surrounding environment, the three-dimensional environmental information may be displayed on the display apparatus in real time, to achieve the purpose of assisting a driver in driving.

In some exemplary embodiments, the three-dimensional environmental information may include a panoramic image and a panoramic point cloud image. The panoramic image may be collected by a vision sensor, and the panoramic point cloud image may be collected by a lidar or a millimeter-wave radar. In this case, the movable platform may display the panoramic image and the panoramic point cloud image on the same display apparatus, so as to facilitate combining the two types of images to obtain information of the environment surrounding the movable platform more accurately, thereby making better driving judgment. In this way, the driving safety of the movable platform may be further improved.

In some exemplary embodiments of the present disclosure, the movable platform may collect environmental data in at least two directions of an environment surrounding the movable platform through a sensor(s), perform three-dimensional reconstruction of the environmental data in the at least two directions to obtain three-dimensional environmental information of the environment surrounding the movable platform, and further display the three-dimensional environmental information by a display apparatus. According to the present disclosure, on the one hand, the environmental data of the movable platform in a plurality of directions can be obtained, so as to ensure the integrity and accuracy of the obtained environmental data; on the other hand, the collected environmental data can be processed in real time, and the processed three-dimensional environmental information can be displayed on the display apparatus in real time, so that a driver can intuitively know the environmental information of the environment surrounding the movable platform, which can assist the driver in driving more effectively and improve the driving safety of the movable platform.

Figure 5:
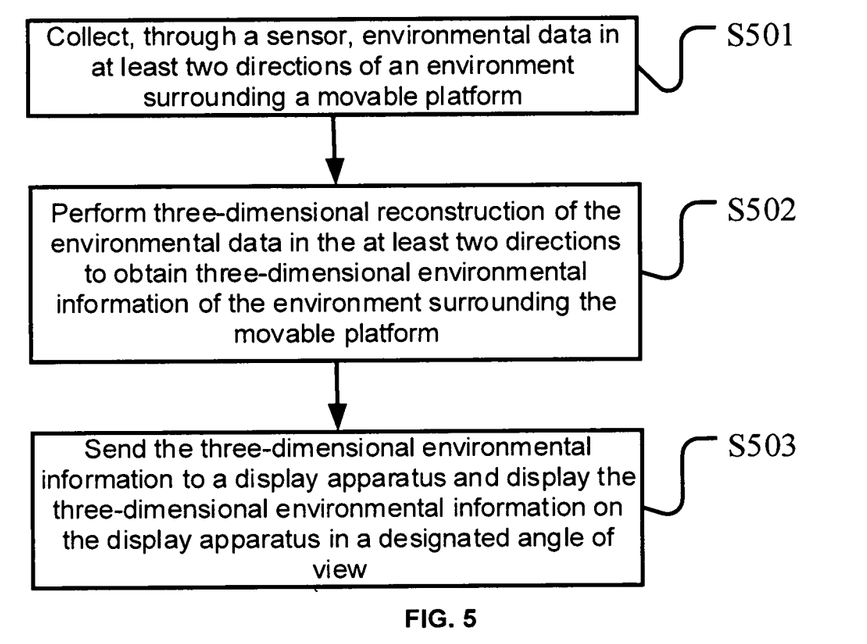
FIG. 5 is a flow diagram of a data processing method according to some exemplary embodiments of the present disclosure.

Referring to FIG. 5, FIG. 5 is a flow diagram of another data processing method provided in an embodiment of the present disclosure. The method in the embodiment of the present disclosure may be executed by a movable platform, which includes a sensor.

In the data processing method shown in FIG. 5, in S501, the movable platform may collect environmental data in at least two directions of an environment surrounding the movable platform by the sensor. The sensor(s) may include at least one of a vision sensor, a lidar, a millimeter-wave radar, and an ultrasonic sensor. As for the specific manner of implementation of Step S501, reference may be made to the relevant illustrations of Step S201 in the above embodiment, which will not be elaborated herein.

In Step S502, as environmental data in at least two directions of the environment surrounding the movable platform are collected by the movable platform through the sensor(s), three-dimensional reconstruction of the environmental data in the at least two directions may be performed to obtain three-dimensional environmental information of the environment surrounding the movable platform. For the specific manner of implementation of Step S502, reference may be made to the relevant illustrations of Step S202 in the above embodiment, which will not be elaborated herein.

Further, in Step S503, as the three-dimensional environmental information of the environment surrounding the movable platform is obtained by the movable platform, the three-dimensional environmental information may be sent to the display apparatus, and displayed on the display apparatus in a designated angle of view. The designated angle of view may include a direct front angle of view, an upper front angle of view, a rear angle of view, a left rear angle of view, a right rear angle of view, a top angle of view, etc. of the movable platform; the specific angle of view used may be preset by a developer or selected by a driver; alternatively, it may also be determined in combination with a display strategy.

In some exemplary embodiments, a plurality of angles of view may be preset as available options, and the driver may select a designated angle of view from the available plurality of angles of view as needed.

In some exemplary embodiments, the display strategy may be used for indicating, when the movable platform needs to turn right, that the designated angle of view is switched to the right rear angle of view; when the movable platform needs to turn left, the designated angle of view is switched to the left rear angle of view; when the movable platform runs straight forward, the designated angle of view is switched to the upper front angle of view; and when the movable platform needs to go backward, the designated angle of view is switched to the rear angle of view.

In some exemplary embodiments, it is determined that the movable platform needs to turn right when it is detected that a right-turn function of the movable platform is activated. For example, it may be determined that the right-turn function is activated when it is detected that a right turn signal is turned on. In another example, it may be determined that the movable platform needs to turn right when it is detected that a distance between the movable platform and a right lane line is less than or equal to a preset right-turn distance threshold.

Similarly, in some exemplary embodiments, it is determined that the movable platform needs to turn left when it is detected that a left-turn function of the movable platform is activated. For example, it may be determined that the left-turn function is activated when it is detected that a left-turn signal is turned on. In another example, it may be determined that the movable platform needs to turn left when it is detected that a distance between the movable platform and a left lane line is less than or equal to a preset left-turn distance threshold.

Correspondingly, in some exemplary embodiments, it can be determined that the movable platform needs to reverse when it is detected that a reverse function (such as the reverse gear) of the movable platform is activated.

Figure 6:
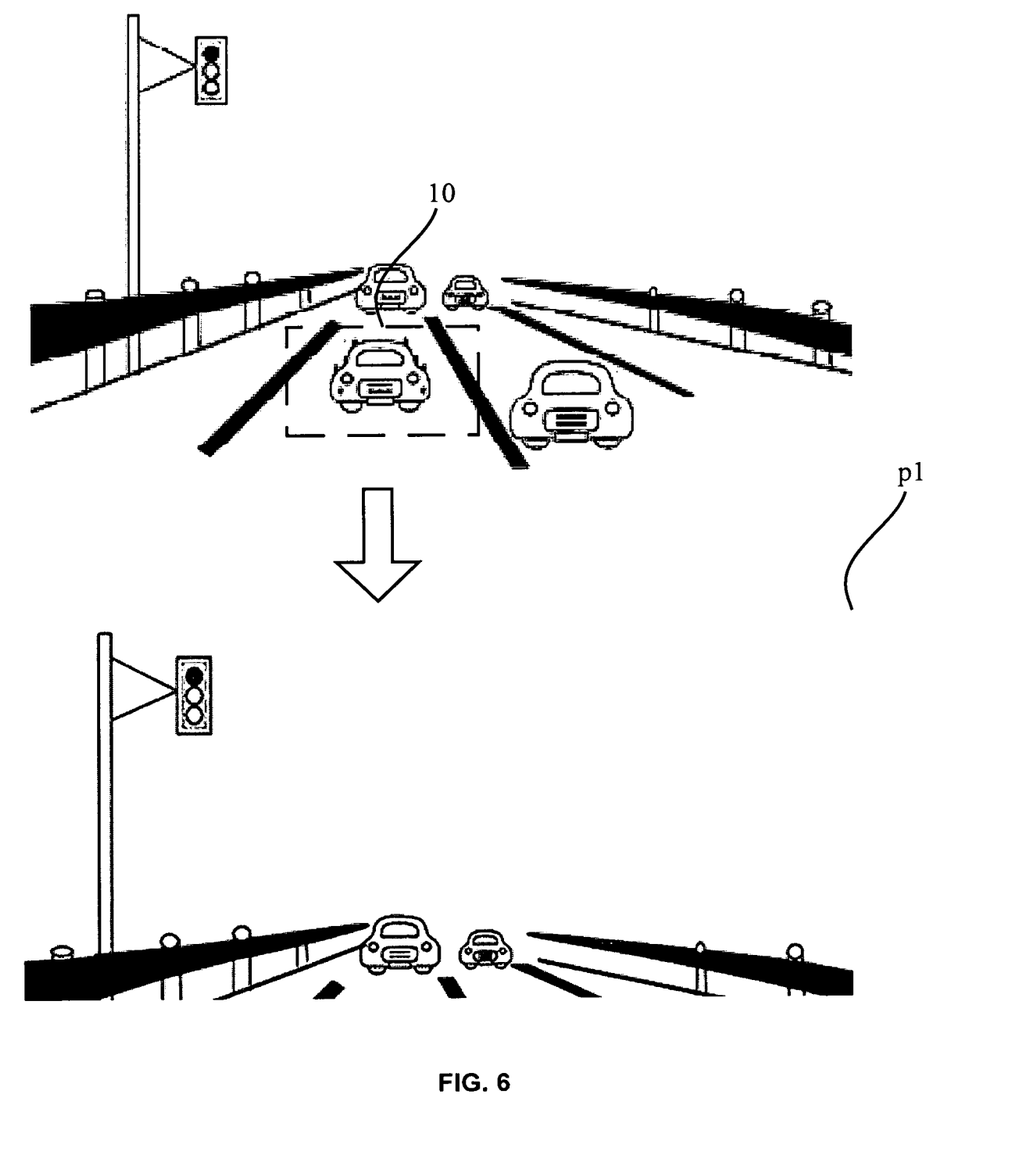
FIG. 6 is a diagram of a scenario according to some exemplary embodiments of the present disclosure.

In some exemplary embodiments, the designated angle of view includes an upper front angle of view. For example, it is assumed that the movable platform is a car, the upper front angle of view may be based on the front region of the car, include the front, upper, left, and right of the front region of the car, and may include a scene at a certain distance in the front of the car, scenes on the left and right, and a relatively wide scene in the rear. Referring to FIG. 6, for a car 10 in FIG. 6, an image p1 is a three-dimensional environmental image that corresponds to the upper front angle of view of the car 10, and includes the vehicles in the front of the car, the traffic lights above, and the lane lines and guard rails on the left and right of the car.

In some exemplary embodiments, when the movable platform includes not only a vision sensor but also a lidar or a millimeter-wave radar, priority is given to the vision sensor to collect the environmental data in at least two directions of the environment surrounding the movable platform. Further, when it is detected that the environment surrounding the movable platform has a light intensity beyond a preset light intensity range, the environmental data in at least two directions of an environment surrounding the movable platform may be collected by the lidar or the millimeter-wave radar. The preset light intensity range includes a maximum light intensity threshold and a minimum light intensity threshold, and the maximum light intensity threshold and the minimum light intensity threshold are both determined based on experimental measurement data. In this way, it can be ensured that under the circumstances that the light of the environment surrounding the movable platform is so strong or insufficient that the vision sensor cannot collect the environmental data accurately; the environmental data in at least two directions of the environment surrounding the movable platform can still be obtained accurately.

Alternatively, when the movable platform detects that a fault of the vision sensor, the lidar or millimeter-wave radar may be used for collecting environmental data in at least two directions of an environment surrounding the movable platform. Therefore, it is ensured that the environmental data in the at least two directions of the environment surrounding the movable platform may still be obtained accurately under the circumstances that the vision sensor cannot function properly.

In some exemplary embodiments of the present disclosure, the movable platform may collect environmental data in at least two directions of an environment surrounding the movable platform through a sensor(s), perform three-dimensional reconstruction of the environmental data in the at least two directions to obtain three-dimensional environment information of the environment surrounding the movable platform, and further display the three-dimensional environmental information on the display apparatus in a designated angle of view. In this way, the intelligence of the three-dimensional environmental information display may be enhanced, and the user experience can be improved.

Figure 7:
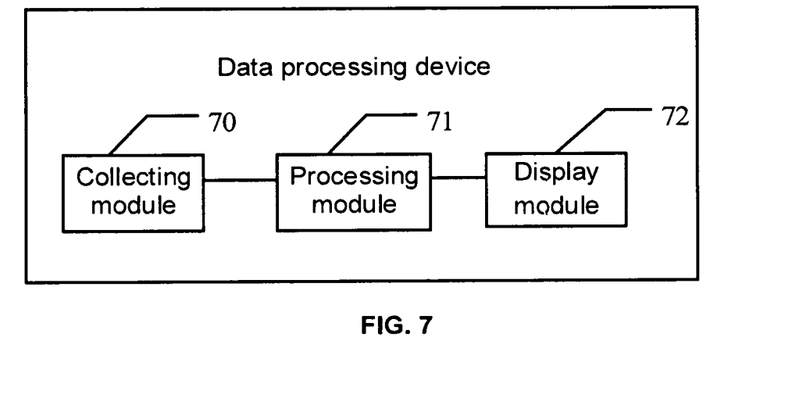
FIG. 7 is a structural diagram of a data processing device according to some exemplary embodiments of the present disclosure.

Based on the illustrations of the above method embodiments, in some exemplary embodiments, the present disclosure further provides a data processing device as shown in FIG. 7; the data processing device is disposed on a movable platform including a sensor, the data processing device may include:

a collecting module 70 for collecting environmental data in at least two directions of an environment surrounding the movable platform through the sensor;

a processing module 71 for performing three-dimensional reconstruction of the environmental data in the at least two directions and obtaining three-dimensional environmental information of the environment surrounding the movable platform;

a display module 72 for displaying the three-dimensional environmental information on a display apparatus.

In some exemplary embodiments, the processing module 71 is specifically used for combining the environmental data in the at least two directions to realize the three-dimensional reconstruction, that is, reconstruct the environmental data in three-dimension.

In some exemplary embodiments, the at least two directions include omni-directions.

In some exemplary embodiments, the sensor includes at least one of a vision sensor, a lidar, a millimeter-wave radar, and an ultrasonic sensor.

In some exemplary embodiments, the sensor includes a plurality of vision sensors arranged in a plurality of directions of the movable platform to realize multi-directional coverage.

In some exemplary embodiments, the sensor includes a plurality of lidars, which are arranged in a plurality of directions of the movable platform to realize multi-directional coverage; alternatively, the sensor includes a rotating lidar.

In some exemplary embodiments, at least one of the vision sensor, the lidar, and the millimeter-wave radar is used as a main sensor, and the ultrasonic sensor is used as an assistant sensor for collecting environmental information corresponding to a scanning blind area of the main sensor.

In some exemplary embodiments, the three-dimensional environmental information includes a panoramic image and a panoramic point cloud image; the display module 72 is specifically used for displaying the panoramic image and the panoramic point cloud image on the same display apparatus.

In some exemplary embodiments, the three-dimensional environmental information is displayed through a display apparatus; the display module 72 is further specifically used for displaying the three-dimensional environmental information on the display apparatus in a designated angle of view.

In some exemplary embodiments, the designated angle of view includes an upper front angle of view.

In some exemplary embodiments, the collecting module 70 is specifically used for collecting environmental data in at least two directions of an environment surrounding the movable platform through the lidar or the millimeter-wave radar when it is detected that a fault occurs in the vision sensor or the environment surrounding the movable platform has a light intensity beyond a preset light intensity range.

In some exemplary embodiments, the movable platform is a vehicle.

In some exemplary embodiments, the display apparatus is located outside the movable platform, and the movable platform includes a drone.

In some exemplary embodiments of the present disclosure, for the specific implementation of the above modules, reference may be made to the illustrations of the relevant contents in the embodiments corresponding to FIG. 2 or FIG. 5.

Figure 8:
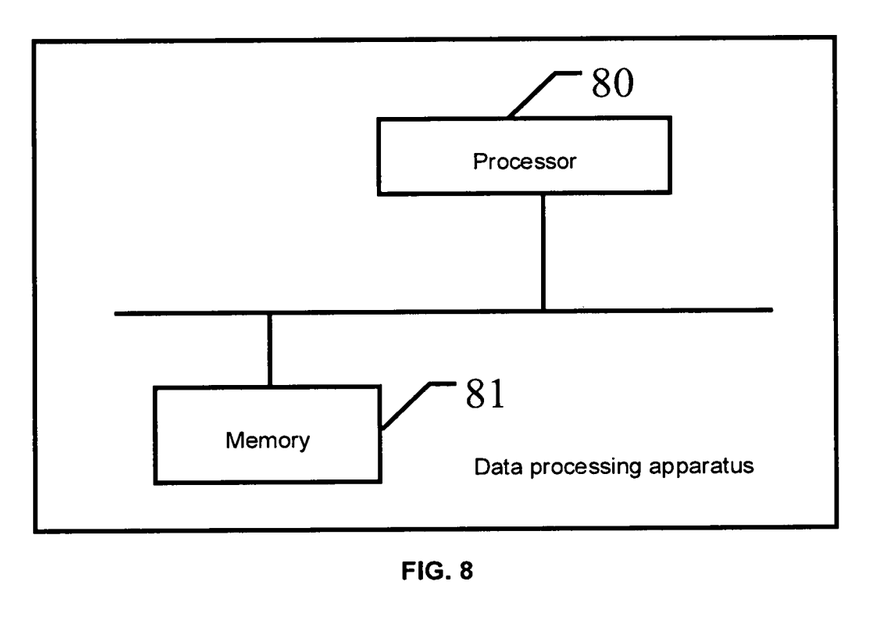
FIG. 8 is a structural diagram of a data processing apparatus according to some exemplary embodiments of the present disclosure.

Referring to FIG. 8, it is a structural block diagram of a data processing device provided in an embodiment of the present disclosure; the data processing device is disposed on a movable platform including a sensor; the data processing device may include at least one processor 80 and at least one memory 81; the at least one processor 80 and the at least one memory 81 are connected through a bus; the at least one memory 81 is used for storing program instructions and environmental data.

The at least one memory 81 may include a volatile memory, such as a random-access memory (RAM); the at least one memory 81 may also include a non-volatile memory, such as a flash memory and a solid-state drive (SSD); the at least one memory 81 may also be a double data rate SDRAM (DDR); the at least one memory 81 may also include a combination of the above types of memories.

In some exemplary embodiments of the present disclosure, the at least one memory 81 is used for storing computer programs, which include program instructions; when the program instructions are invoked, the at least one processor 80 is configured to: collect environmental data in at least two directions of an environment surrounding the movable platform through the sensor; perform three-dimensional reconstruction of the environmental data in the at least two directions, obtain three-dimensional environmental information of the environment surrounding the movable platform, and display the three-dimensional environmental information on a display apparatus.

In some exemplary embodiments, the at least one processor 80 is specifically used for combining the environmental data in the at least two directions to realize the three-dimensional reconstruction, that is, reconstruct the environmental data in three-dimension.

In some exemplary embodiments, the at least two directions include omni-directions.

In some exemplary embodiments, the sensor includes at least one of a vision sensor, a lidar, a millimeter-wave radar, and an ultrasonic sensor.

In some exemplary embodiments, the sensor includes a plurality of vision sensors arranged in a plurality of directions of the movable platform to realize multi-directional coverage.

In some exemplary embodiments, the sensor includes a plurality of lase radars, which are arranged in a plurality of directions of the movable platform to realize multi-directional coverage;

alternatively, the sensor includes a rotating lidar.

In some exemplary embodiments, at least one of the vision sensor, the lidar, and the millimeter wave radar is used as a main sensor, and the ultrasonic sensor is used as an assistant sensor for collecting environmental data that correspond to a scanning blind area of the main sensor.

In some exemplary embodiments, the three-dimensional environmental information includes a panoramic image and a panoramic point cloud image; the processor is specifically further used for displaying the panoramic image and the panoramic point cloud image on the same display apparatus.

In some exemplary embodiments, the at least one processor 80 is specifically further used for displaying the three-dimensional environmental information on the display apparatus in a designated angle of view.

In some exemplary embodiments, the designated angle of view includes an upper front angle of view.

In some exemplary embodiments, the processor 80 is specifically further used for collecting environmental data in at least two directions of an environment surrounding the movable platform through the lidar or the millimeter-wave radar when it is detected that a fault occurs in the vision sensor or the environment surrounding the movable platform has a light intensity beyond a preset light intensity range.

In some exemplary embodiments, the movable platform is a vehicle.

In some exemplary embodiments, the display apparatus is located outside the movable platform, and the movable platform includes a drone.

In some exemplary embodiments of the present disclosure, for the specific implementation of the at least one processor 80, reference may be made to the illustrations of the relevant contents in the embodiments corresponding to FIG. 2 or FIG. 5.

Figure 9:
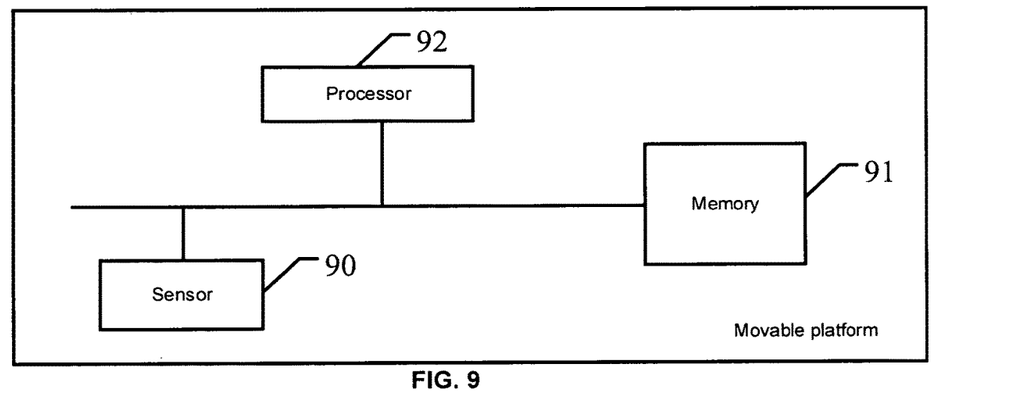
FIG. 9 is a structural diagram of a movable platform according to some exemplary embodiments of the present disclosure.

Referring to FIG. 9, it is a structural block diagram of a movable platform provided in an embodiment of the present disclosure; the movable platform includes a sensor; the data processing device may include at least one sensor 90, at least one memory 91, and at least one processor 92; the at least one sensor 90, the at least one memory 91, and the at least one processor 92 are connected through a bus; the at least one memory 91 is used for storing program instructions and environmental data.

The at least one memory 91 may include a volatile memory, such as a random-access memory (RAM); the memory 91 may also include a non-volatile memory, such as a flash memory and a solid-state drive (SSD); the at least one memory 91 may also be a double data rate SDRAM (DDR); the at least one memory 91 may also include a combination of the above types of memories.

In some exemplary embodiments of the present disclosure, the at least one memory 91 is used for storing computer programs, which include program instructions; when the program instructions are invoked, the at least one processor 92 is configured to: collect environmental data in at least two directions of an environment surrounding the movable platform through the sensor; perform three-dimensional reconstruction of the environmental data in the at least two directions, obtain three-dimensional environmental information of the environment surrounding the movable platform, and display the three-dimensional environmental information on a display apparatus.

In some exemplary embodiments, the at least one processor 92 is specifically used for combining the environmental data in the at least two directions to realize the three-dimensional reconstruction, that is, reconstruct the environmental data in three-dimension.

In some exemplary embodiments, said at least two directions include omni-directions.

In some exemplary embodiments, the sensor includes at least one of a vision sensor, a lidar, a millimeter-wave radar, and an ultrasonic sensor.

In some exemplary embodiments, the sensor includes a plurality of vision sensors, which are arranged in a plurality of directions of the movable platform to realize multi-directional coverage.

In some exemplary embodiments, the sensor includes a plurality of lidars arranged in a plurality of directions of the movable platform to realize multi-directional coverage; alternatively, the sensor includes a rotating lidar.

In some exemplary embodiments, at least one of the vision sensor, the lidar, and the millimeter-wave radar is used as a main sensor, and the ultrasonic sensor is used as an assistant sensor for collecting environmental data that correspond to a scanning blind area of the main sensor.

In some exemplary embodiments, the three-dimensional environmental information includes a panoramic image and a panoramic point cloud image; the processor 92 is specifically further used for displaying the panoramic image and the panoramic point cloud image on the same display apparatus.

In some exemplary embodiments, the at least one processor 92 is specifically further used for displaying the three-dimensional environmental information on the display apparatus in a designated angle of view.

In some exemplary embodiments, the designated angle of view includes an upper front angle of view.

In some exemplary embodiments, the at least one processor 92 is specifically further used for collecting environmental data in at least two directions of an environment surrounding the movable platform through the lidar or the millimeter-wave radar when it is detected that a fault occurs in the vision sensor or the environment surrounding the movable platform has a light intensity beyond a preset light intensity range.

In some exemplary embodiments, the movable platform is a vehicle.

In some exemplary embodiments, the display apparatus is located outside the movable platform, and the movable platform includes a drone.

In some exemplary embodiments of the present disclosure, for the specific implementation of the at least one processor 92, reference may be made to the illustrations of the relevant contents in the embodiments corresponding to FIG. 2 or FIG. 5.

Those skilled in the art may understand that all or part of the processes in the above embodiment methods may be implemented by instructing relevant hardware through computer programs; the programs may be stored in a computer readable storage medium, and when executed, include the processes in some exemplary embodiments of the above methods. The storage medium may be a magnetic disk, an optical disk, a read-only memory (ROM), or a random access memory (RAM), etc.

Those disclosed above are only some of some exemplary embodiments of the present disclosure; it is certain that the scope of protection of the present disclosure cannot be limited to them; those skilled in the art may understand that all or part of the processes for implementing the above embodiments, as well as equivalent changes that are made in accordance with the claims of the present disclosure, still fall within the scope of the disclosure.

What is claimed is:

1. A data processing method for a movable platform, comprising:
    collecting, through at least one sensor of a movable platform, environmental data in at least two directions of an environment surrounding the movable platform;
    performing, by the movable platform, three-dimensional reconstruction on the environmental data in the at least two directions to obtain three-dimensional environmental information of the environment surrounding the movable platform, wherein the three- dimensional environmental information comprising a panoramic image and a panoramic point cloud image; and
    displaying both the panoramic image and the panoramic point cloud image on a same display apparatus of the movable platform;

wherein the at least one sensor comprises a vision sensor, a lidar, a millimeter-wave radar, and an ultrasonic sensor;

wherein the vision sensor, the lidar and the millimeter-wave radar are main sensors, and the ultrasonic sensor is an assistant sensor for collecting the environmental data corresponding to a scanning blind area of the main sensor;

wherein the panoramic image is collected by the vision sensor, and the panoramic point cloud image is collected by the lidar or the millimeter-wave radar;

wherein the displaying of the three-dimensional environmental information on the display apparatus comprises:

displaying the three-dimensional environmental information on the same display apparatus in a designated angle of view;

wherein the designated angle of view comprises an upper front angle of view.

2. The method according to claim 1, wherein the performing of the three-dimensional reconstruction on the environmental data in the at least two directions-includes comprises:

combining the environmental data in the at least two directions to reconstruct the environmental data in three-dimension.

3. The method according to claim 1, wherein the at least two directions comprise omni-directions.

4. The method according to claim 1, wherein the at least one sensor comprises a plurality of vision sensors arranged in a plurality of directions on the movable platform for multi-directional coverage.

5. The method according to claim 1, wherein the at least one sensor comprises:

a plurality of lidars arranged in a plurality of directions on the movable platform for multi-directional coverage; or
a rotating lidar.

6. The method according to claim 1, wherein the collecting of the environmental data in the at least two directions of the environment surrounding the movable platform comprises:

collecting the environmental data in the at least two directions of the environment surrounding the movable platform through the lidar or the millimeter-wave radar upon detecting that a fault occurs in the vision sensor or the environment surrounding the movable platform has a light intensity beyond a preset light intensity range.

7. The method according to claim 1, wherein the panoramic image and the panoramic point cloud image are superimposed one over another and displayed on the same display apparatus.

8. The method according to claim 1, wherein the movable platform is a vehicle comprising the same display apparatus.

9. The method according to claim 1, wherein the same display apparatus is located outside the movable platform.

10. An apparatus, comprising:
at least one sensor;
at least one storage medium storing a set of instructions for processing data for a movable platform; and
at least one processor in communication with the at least one storage medium, wherein during operation, the at least one processor executes the set of instructions to:
collect, through the at least one sensor, environmental data in at least two directions of an environment surrounding the movable platform;
perform three-dimensional reconstruction on the environmental data in the at least two directions to obtain three-dimensional environmental information of the environment surrounding the movable platform, wherein the three-dimensional environmental information comprising a panoramic image and a panoramic point cloud image; and
display both the panoramic image and the panoramic point cloud image on a same display apparatus mounted on the movable platform;
wherein the at least one sensor comprises a vision sensor, a lidar, a millimeter-wave radar, and an ultrasonic sensor;
wherein the vision sensor, the lidar, and the millimeter-wave radar are main sensors, and the ultrasonic sensor is an assistant sensor for collecting the environmental data corresponding to a scanning blind area of the main sensor;
wherein the panoramic image is collected by the vision sensor, and the panoramic point cloud image is collected by the lidar or the millimeter-wave radar;
wherein the displaying of the three-dimensional environmental information on the display apparatus comprises:
displaying the three-dimensional environmental information on the same display apparatus in a designated angle of view;
wherein the designated angle of view comprises an upper front angle of view.

11. The apparatus according to claim 10, wherein the at least one processor further executes the set of instructions to combine the environmental data in the at least two directions to reconstruct the environmental data in three-dimension.

12. The apparatus according to claim 10, wherein the at least two directions comprise omni-directions.

13. The apparatus according to claim 10, wherein the at least one processor further executes the set of instructions to superimpose and display on the same display apparatus the panoramic image and the panoramic point cloud image one over another.

14. A movable platform, comprising:
at least one sensor;
at least one storage medium storing a set of instructions for processing data for the movable platform; and
at least one processor in communication with the at least one storage medium, wherein during operation, the at least one processor executes the set of instructions to:
collect, through the at least one sensor, environmental data in at least two directions of an environment surrounding the movable platform;
perform three-dimensional reconstruction on the environmental data in the at least two directions to obtain three-dimensional environmental information of the environment surrounding the movable platform, wherein the three-dimensional environmental information comprising a panoramic image and a panoramic point cloud image; and
display both the panoramic image and the panoramic point cloud image on a same display apparatus mounted on the movable platform;
wherein the at least one sensor comprises a vision sensor, a lidar, a millimeter-wave radar, and an ultrasonic sensor;
wherein the vision sensor, the lidar, and the millimeter-wave radar are main sensors, and the ultrasonic sensor is an assistant sensor for collecting the environmental data corresponding to a scanning blind area of the main sensor;
wherein the panoramic image is collected by the vision sensor, and the panoramic point cloud image is collected by the lidar or the millimeter-wave radar;

wherein the displaying of the three-dimensional environmental information on the display apparatus comprises:
displaying the three-dimensional environmental information on the same display apparatus in a designated angle of view;
wherein the designated angle of view comprises an upper front angle of view.

15. The method according to claim 6, wherein the preset light intensity range comprises a maximum light intensity threshold and a minimum light intensity threshold, and the maximum light intensity threshold and the minimum light intensity threshold are both determined based on experimental measurement data.

16. The method according to claim 1, wherein the upper front angle of view is based on the front region of the movable platform, comprises the front, upper, left, and right of the front region of the movable platform, and comprises a scene at a certain distance in the front of the movable platform, scenes on the left and right, and a relatively wide scene in the rear.

17. The method according to claim 6, wherein the vision sensors collect a first environmental image in the front of the movable platform, an second environmental image in the rear thereof, a third environmental image on the left thereof, and a fourth environmental image on the right thereof;
wherein the movable platform combine the first environmental image, the second environmental image, the third environmental image and the fourth environmental image together to form a three-dimensional environmental image of the environment surrounding the movable platform.

* * * * *